United States Patent
Nay (10) Patent No.: US 9,104,394 B1
(45) Date of Patent: Aug. 11, 2015

(54) IDENTIFYING POWER PORTS OF A POWER DISTRIBUTION BOARD

(71) Applicant: Google Inc., Mountain View, CA (US)

(72) Inventor: Shane R. Nay, San Jose, CA (US)

(73) Assignee: Google Inc., Mountain View, CA (US)

( * ) Notice: Subject to any disclaimer, the term of this patent is extended or adjusted under 35 U.S.C. 154(b) by 332 days.

(21) Appl. No.: 13/798,673

(22) Filed: Mar. 13, 2013

Related U.S. Application Data (60) Provisional application No. 61/750,610, filed on Jan. 9, 2013.

(51) Int. Cl.
*G06F 1/26* (2006.01)
*H02J 13/00* (2006.01)

(52) U.S. Cl.
CPC ...... *G06F 1/26* (2013.01); *G06F 1/266* (2013.01); *H02J 13/0048* (2013.01)

(58) Field of Classification Search
CPC ......... G06F 1/26; G06F 1/266; H02J 13/0048
See application file for complete search history.

(56) References Cited

U.S. PATENT DOCUMENTS

| 8,726,045 B2 * | 5/2014 | Goodrum et al. ............. 713/300 |
| 2009/0217073 A1 * | 8/2009 | Brech et al. .................. 713/340 |

* cited by examiner

*Primary Examiner* — Albert Wang
(74) *Attorney, Agent, or Firm* — Lerner, David, Littenberg, Krumholz & Mentlik, LLP (57) ABSTRACT

A method and apparatus is provided for identifying ports on a power distribution board. In one aspect, the power distribution board is configured to output a plurality of signals from a plurality of ports, so that each of the output signals is different with respect to at least one signal characteristic from the other signals. In another aspect a table is provided that relates port identifiers to values of the signal characteristic. A server measures the value of the signal characteristic for a signal that is fed to the server by the power distribution board and identifies the port that outputs the signal by consulting the table.

23 Claims, 8 Drawing Sheets

IDENTIFYING POWER PORTS OF A POWER DISTRIBUTION BOARD

CROSS-REFERENCE TO RELATED APPLICATIONS

The present application claims the benefit of the filing date of U.S. Provisional Patent Application No. 61/750,610 filed Jan. 9, 2013, the disclosure of which is hereby incorporated herein by reference.

BACKGROUND

A typical server rack may include a steel enclosure housing a number of servers. The servers may be powered by the same power supply unit. Moreover, each server may use a different power cord to draw power from the power supply unit. When the power cords are close to each other, they may entwine and twist together in the back of the server rack. When a server fails, it may be desirable to unplug the server and remove it from the rack for repair. However, if the power cords are entwined, it may be difficult to trace the server's power cord to the port where it is connected. The greater the number of power cords, the harder to find that port and unplug the failed server.

SUMMARY

In one aspect, a system is provided that includes a power distribution board having a first port and a second port. The power distribution board is configured to output a first signal from the first port and a second signal from the second port, such that the first signal and the second signal differ with respect to at least one signal characteristic. The signal characteristic is selected from the group consisting of voltage, current flow rate, frequency, and polarity. The system further includes a first server capable of being powered by the first signal or the second signal and determining whether the signal powering the first server is the first signal or the second signal based on the powering signal's signal characteristic. The first server is connected to the first port and the first server is powered by the first signal. The system further includes a second server capable of being powered by either the first signal or the second signal and determining whether the signal powering the first server is the first signal or the second signal based on the powering signal's signal characteristic. The second server is connected to the second port and the second server is powered by the second signal.

In another aspect, a method is provided for powering at least a first server and a second server. The method includes connecting a power distribution board to a power source and dividing a signal supplied by the power source into at least a first signal and a second signal, modifying the first signal with a first resistor to produce a first modified signal. A characteristic of the first signal is modified with a first circuit to produce a first modified signal that meets the power requirements of the first server and the second server, and a characteristic of the second signal is modified with a second circuit to produce a second modified signal that meets the power requirements of the first server and the second server; The method further includes outputting the first modified signal, from a first port on the power distribution board to power the first server and outputting the second modified signal from a second port on the power distribution board to power the second server. The first circuit and second circuit are configured such that the port from which the first server is being powered and the port from which the second server is being powered may be determined from a difference between the modified characteristic of the first signal and the modified characteristic of the second signal.

In yet another aspect, an apparatus is provided for identifying a port on a power distribution board that is supplying power to a server. The apparatus includes a memory that stores a table that relates at least signal characteristic with a first port identifier, and a second value for the signal characteristic with a second port identifier, the first value being greater than the second value. The apparatus may further include a processor, coupled to the memory, and configured to receive a third value of the signal characteristic for a signal that is supplied to a first server, receive a fourth value of the signal characteristic for a second signal that is supplied to a second server and determine that the first server is connected to the first port based on one or more of (i) the third value being less than the fourth value, (ii) the first value being less than the third value, and (iii) the third value being equal to the first value.

DETAILED DESCRIPTION

In one aspect, a power distribution board is configured to output a plurality of signals from a plurality of ports. Each of the output signals may be unique with respect to at least one signal characteristic relative to signals output by other ports on the distribution board. The unique characteristic of each signal may be used to identify the port that is the source of that signal.

Figure 1:
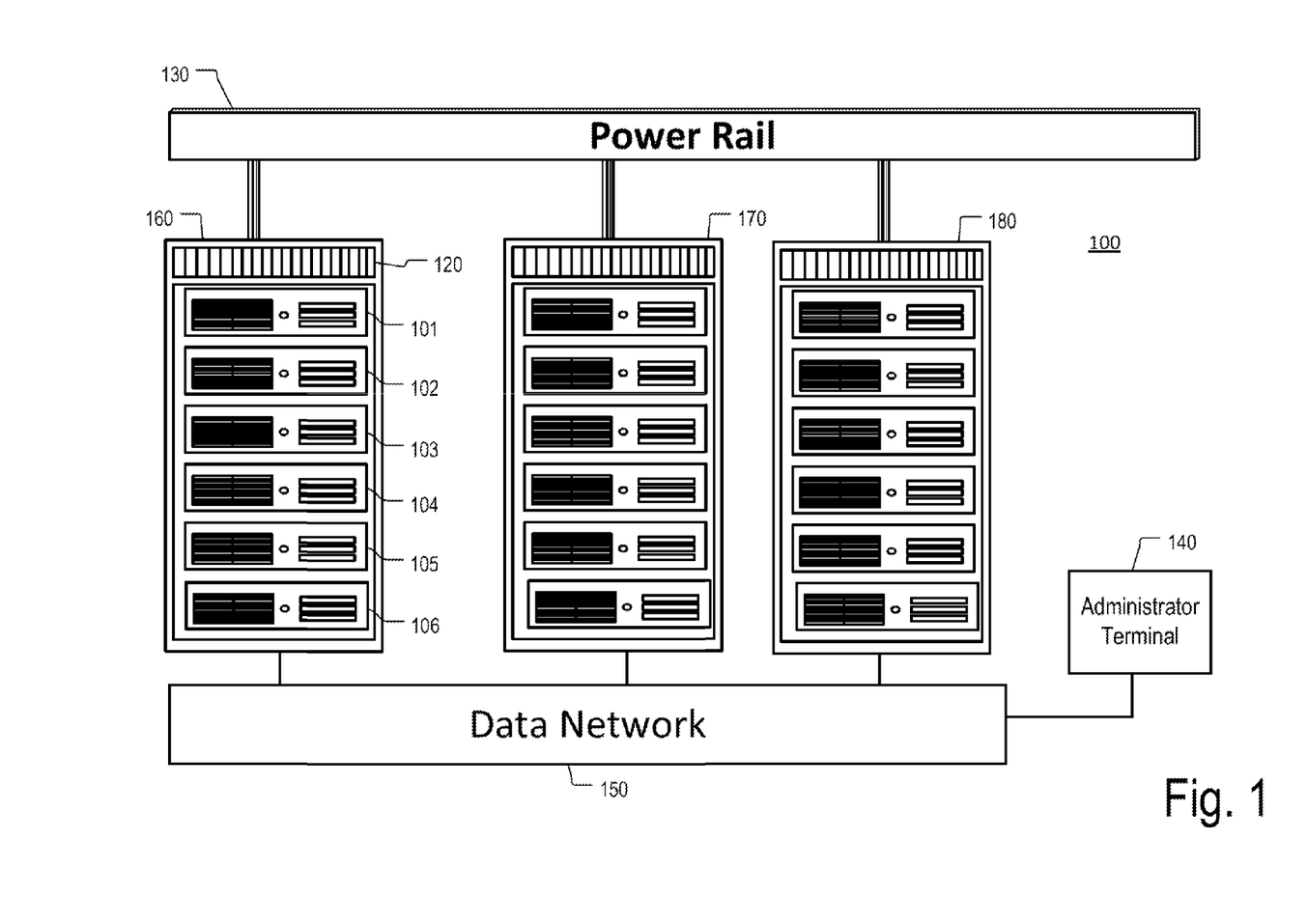
FIG. 1 depicts a schematic diagram of a system in accordance with aspects of the present disclosure.

FIG. 1 depicts a schematic diagram of the system 100. System 100 is a server farm comprising server racks 160, 170, and 180. Each of the server racks comprises a plurality of servers. Each of the servers may communicate with the other servers in the racks 160-180 and terminal 140 via network 150. Network 150 may be an Ethernet network, TCP/IP network, or any other type of data network. The servers in system 100 and terminal 140 may be nodes in the network 150.

Terminal 140 may be a terminal for managing the system 100. In one aspect, terminal 140 may be used to perform back up, adjust network settings, or any other task that is typically performed over the course of data centers' administration. For the purpose of clarity, terminal 140 is depicted as being outside of the server racks 160-180, but it may also be located inside any of the server racks 160-180. Terminal 140 may be a desktop computer, laptop, smartphone, server, a computer cloud, or any other processor-based device or distributed system. As such, terminal 140 may comprise a processor, memory, a display device as well as other hardware that is typically found in processor-based computing devices.

As illustrated by FIG. 1, server rack 160 may include servers 101-106. Each of the servers 101-106 may include one or more processors, memory, permanent storage, network adapter, display and any other hardware typically found in computers. Although not shown in FIG. 1, server rack 160 may also include a switch, a battery backup, an administration terminal, cooling system, and other hardware.

Servers 101-106 may have the same or similar power requirements. In one aspect, the power requirements of a server may mandate that the signal used to power the server meets certain constraints with respect to one or more signal characteristics. For example, the servers 101-106 may require specific voltage (e.g. 50V DC, 120 AC) or specific current flow rate (e.g., 1.2 A).

Servers 101-106 are powered by distribution board 120. Distribution board 120 draws power from power rail 130 and divides it into subsidiary power feeds that are supplied to each of servers 101-106. Distribution board 120 may include any type of hardware that is typically used to divide power. In one example, distribution board 120 receives 50V DC from the power rail 130 and divides it into six separate feeds. Distribution board 120 may be housed separately from the other components of server rack 101 or, alternatively, it may be integrated into power supply unit or another device involved in the provision of power to one or more of the servers 101-106.

Figure 2:
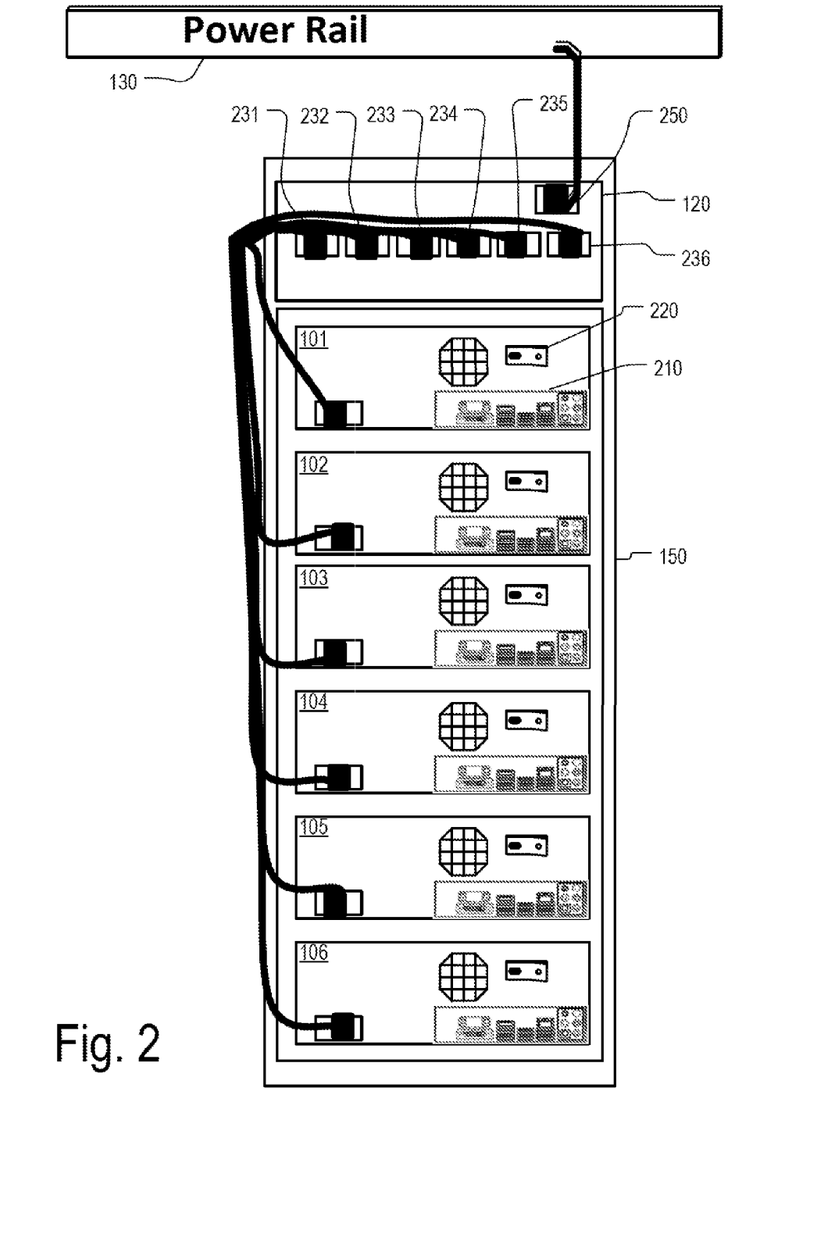
FIG. 2 depicts a schematic diagram of a server rack that is part of the system of FIG. 1.

FIG. 2 depicts a schematic diagram illustrating the manner in which servers 101-106 are connected to distribution board 120. As FIG. 2 illustrates, distribution board 120 comprises input port 250 that is connected to power rail 130 and output ports 231-236. The ports 231-236 may include power sockets, power plugs or any other mechanism for connecting signal conductors (e.g., power cords, PCB bridges). In this example, each of the ports 231-236 is connected to one of the servers 101-106.

Power cords may be run from the servers 101-106 to each of ports 231-236 in order to supply the servers 101-106 with power. Even when the cables are neatly bundled and tucked on the side of the server racks 160, it still may be hard for a person to tell which cable goes where. In that regard, it may be difficult for a technician who wants to remove server 101 from the server rack 160 to identify the port on the distribution board 120 where the server 101 is plugged.

Figure 3A:
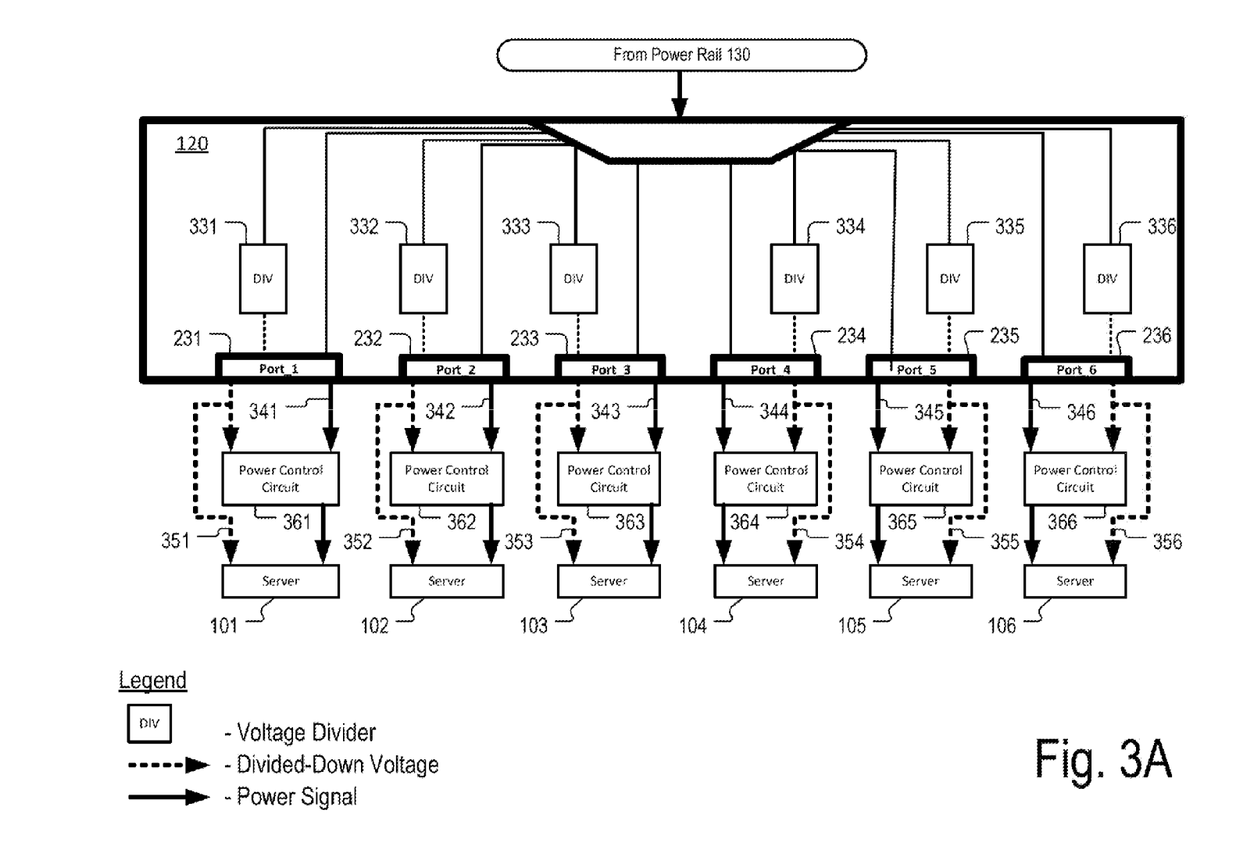
FIG. 3A depicts a schematic diagram of a power distribution board that powers the rack of FIG. 2 in accordance with one example.

FIG. 3A depicts a schematic diagram of distribution board 120 in accordance with aspects of the disclosure. As illustrated, the distribution board may include voltage dividers 331-336 and the ports 231-236. The voltage dividers 331-336 may be used to generate divided-down signals 351-356. Each of the divided-down signals 351-356 may have a different voltage than other signals in the group 351-356. The divided-down signals 351-356 may be used for port identification purposes, as discussed with respect to FIG. 6.

Figure 3B:
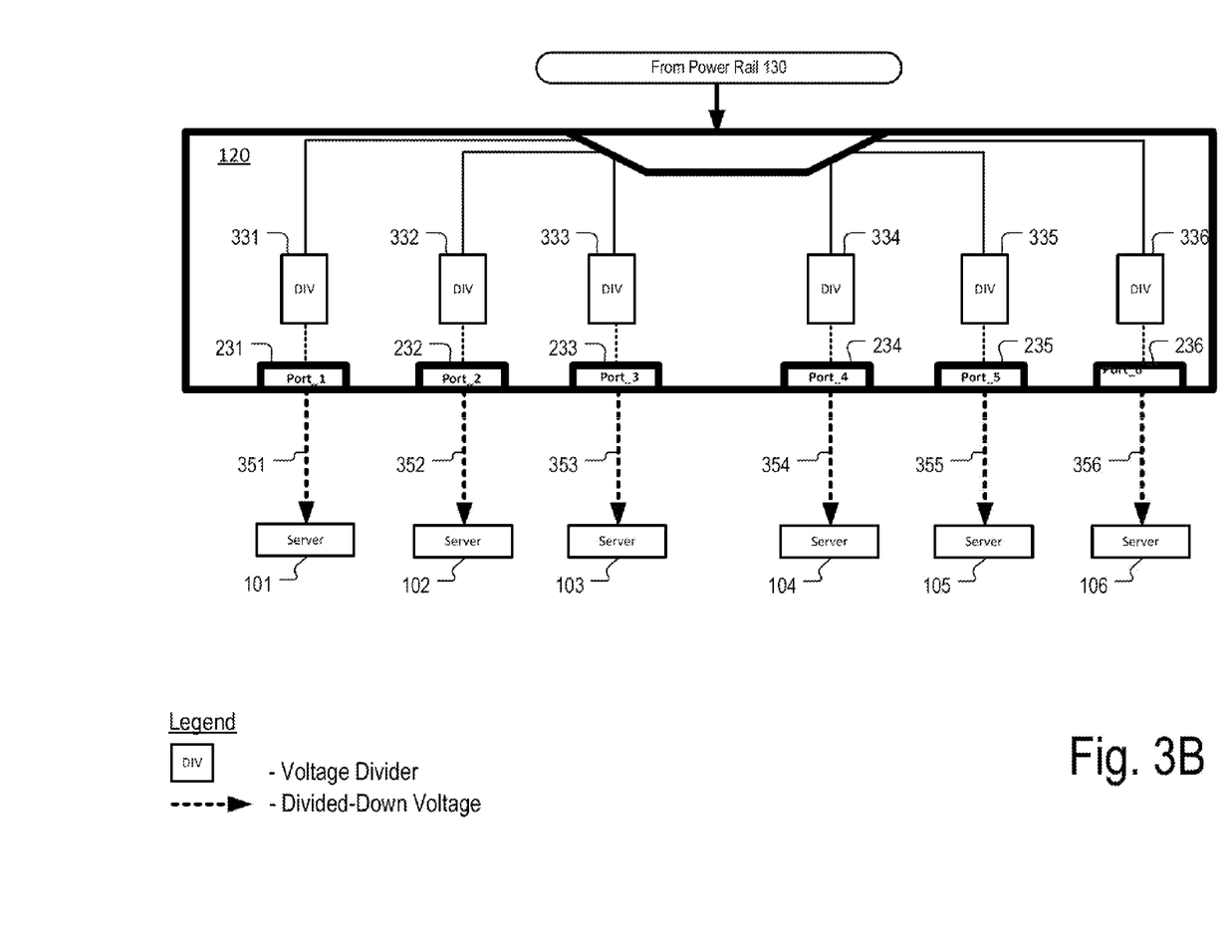
FIG. 3B depicts a schematic diagram of a power distribution board that powers the rack of FIG. 2 in accordance with another example.

FIG. 3B depicts a schematic diagram of the power distribution board 120 in accordance with another aspect of the disclosure. In this example, the divided-down signals 351-356 may be used to power the servers 101-106. Accordingly, the variation in voltage imparted by voltage dividers 331-336 on signals 351-356 may be within the tolerance of the servers 101-106 for voltage. Regarding tolerances, servers 101-106 may be engineered to have some tolerance for various signal characteristics of the power that is supplied to them. For example, the servers 101-106 may be designed to work properly with any voltage in the range of 45V-50V DC or any current flow rate in the range of 1.2 A-1.5 A. Accordingly, as noted above, the voltage dividers 331-336 may be chosen in such a way that the variation in a signal characteristic (e.g., voltage, current flow rate) that is imparted by the voltage dividers 331-336 on signals 351-356 is within the tolerance range for the servers 101-106. That is, the lowest voltage in the group of signals 351-356 may be set above the minimum voltage acceptable to the servers, while the highest voltage in the group of signals 351-356 may be set below the maximum voltage which one or more of the servers 101-106 will accept. In that regard, each of the signals 351-356 may have a signal characteristic that is unique relative to the other signals in the group 351-356 while still complying with the power requirements of the servers 101-106.

Figure 4A:
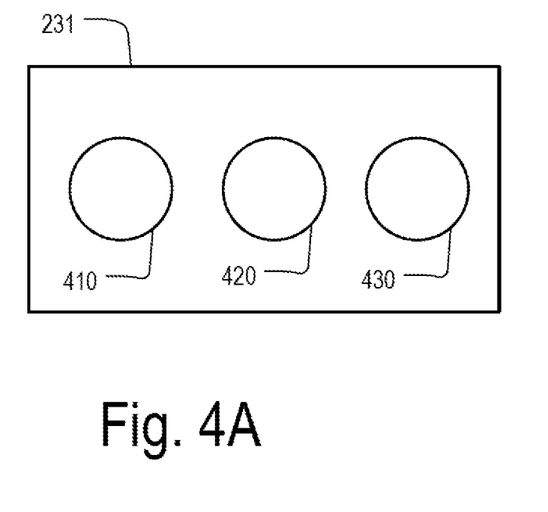
FIG. 4A depicts an example of a port that is found on the power distribution board of FIG. 3.
Figure 4B:
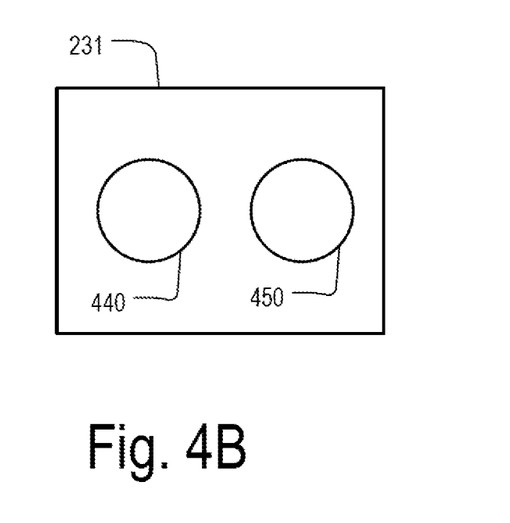
FIG. 4B depicts another example of a port that is found on the power distribution board of FIG. 3.

FIGS. 4A and 4B depict examples of possible configurations of the ports 231-236 on distribution board 120. As illustrated, the ports 231-236 may have various shapes and configurations. For instance, FIG. 4A depicts an example where port 231 comprises three pins—pin 410, pin 420, and pin 430. Pin 410 may be connected to ground, pin 420 may output the signal 341, and pin 430 may output the signal 351. In this example, pin 420 may be used to power server 101 while pin 430 may be used solely for the purpose of controlling the startup delay of the server 101 and/or indicating the port on distribution board 120 where the server 101 is connected. FIG. 4B depicts an example where port 231 comprises two pins. In this example, pin 440 may be connected to ground and pin 450 may output signal 351 (e.g., 49.5V DC). In this example, the pin 450 may be used for providing power to the server 101, controlling the startup delay of the server 101 and/or indicating the port on distribution board 120 where the server 101 is connected. The signal 351 may be used to either (i) indicate the identity of port 231 or (ii) both indicate the identity of port 231 and power server 101.

Figure 5:
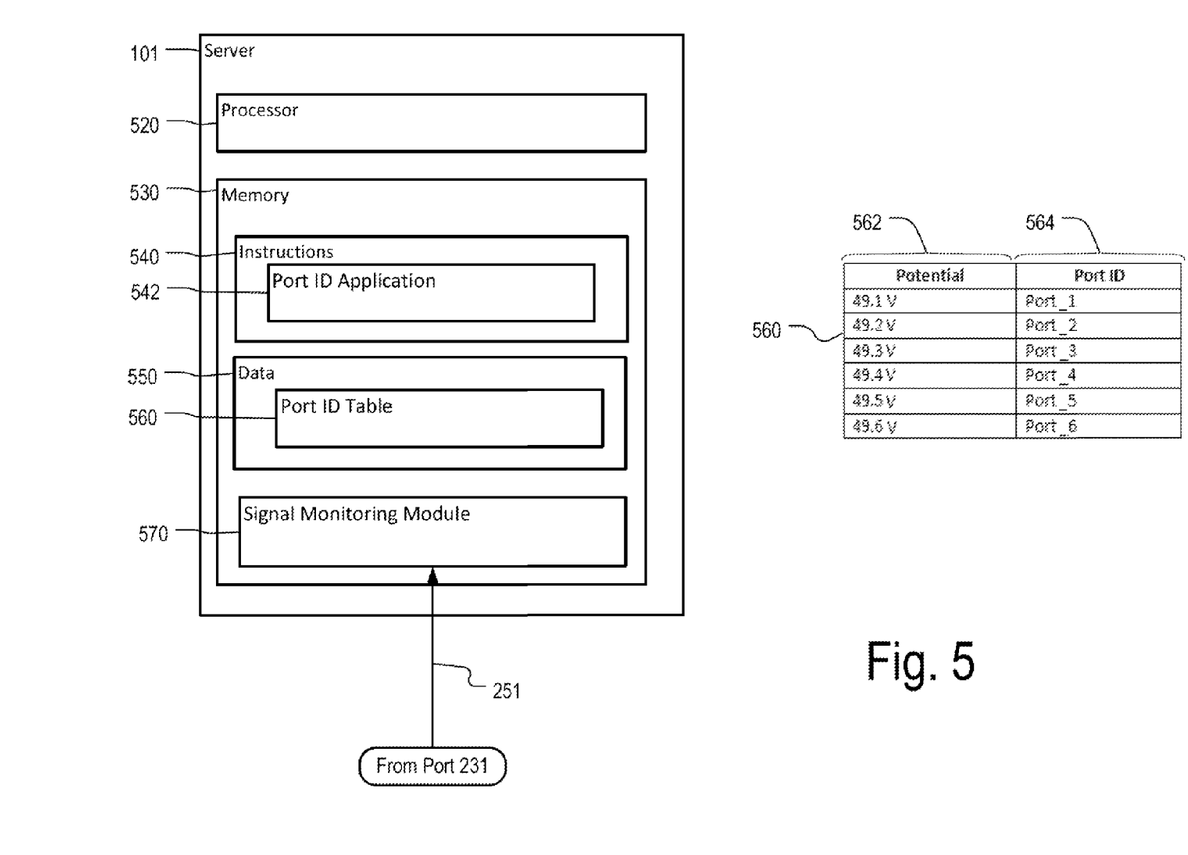
FIG. 5 depicts a schematic diagram of a server that is located in the server rack of FIG. 2.

FIG. 5 depicts a schematic diagram of server 101. Server 101 may contain a processor 520, memory 530 and other components typically present in general purpose computers. Memory 530 of server 101 stores information accessible by processor 520, including instructions 540 that may be executed by the processor 520. Memory also includes data 550 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 520 may be any well-known processor, such as commercially available processors. Alternatively, the processor may be a dedicated controller such as an ASIC.

The instructions 540 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

Data 550 may be retrieved, stored or modified by processor 520 in accordance with the instructions 540. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Signal monitoring module 570 may include one or more sensors for measuring a characteristic (e.g., voltage) of a signal that is used to identify the port on the power distribution board 120 where the server 101 is connected (e.g., the signal 341 or the signal 351). Table 552 relates port identifiers with values of a signal characteristic. The signal characteristic may be voltage, current flow rate, power, direction, polarity, frequency (e.g., AC frequency), or any other characteristic that may be used to describe, at least in part, electric current that is supplied by the distribution board 120 to at least one of servers 101-106. In the present example, the signal characteristic is voltage.

Table 552 includes columns 562 and 564. Column 562 may include different voltage values as entries and column 564 may include different port identifiers. As illustrated, each port identifier in column 564 is related to a voltage value, in the same table row, in column 562. The voltage value related to each port identifier may be the voltage of the signal output by that port. In that regard, by obtaining the voltage for one of signals 351-356 and matching it to the voltage values in column 562 the server 101 (or terminal 140) may determine the port from which the signal is output. Although the example of table 552 contemplates that the power signals are distinguished from each other based on different predetermined values (e.g., 49.1, 49.2, etc.) of the same type of characteristic (e.g., voltage), the power signals may also be distinguished by modifying one characteristic of one signal (e.g., voltage) and modifying a different characteristic of a different signal (e.g., frequency).

Application 542 includes processor-executable instructions for identifying the port on distribution board 120 to which the server 101 is connected. For example, application 542 may measure the voltage of signal 351 and search table 552 to identify a port on distribution board 120 that is associated with the measured voltage value. If the measured voltage is 49.1V, application 542 may search table 552 and determine that the port 231 is associated with this particular voltage value. Afterwards, application 542 may output an indication of the port on display screen or transmit the indication to a remote terminal. Although, in this example, application 542 measures the voltage of signal 351, in a similar fashion it may use another signal characteristic of signal 341 to identify the port on the distribution board 120 where the server 101 is connected.

Although table 552 and application 542 are depicted as being stored in the memory of server 101, they can be stored elsewhere. For example, application 542 may be executed on terminal 140, or on both server 101 and terminal 140. For example, application 542 may determine the value of a signal characteristic of signal 351 and transmit the determined value to terminal 140. Upon receiving the indication, terminal 140 may search the table 552 and identify the port that outputs signal 351. Table 552 may also reside in the memory of terminal 140.

Figure 6:
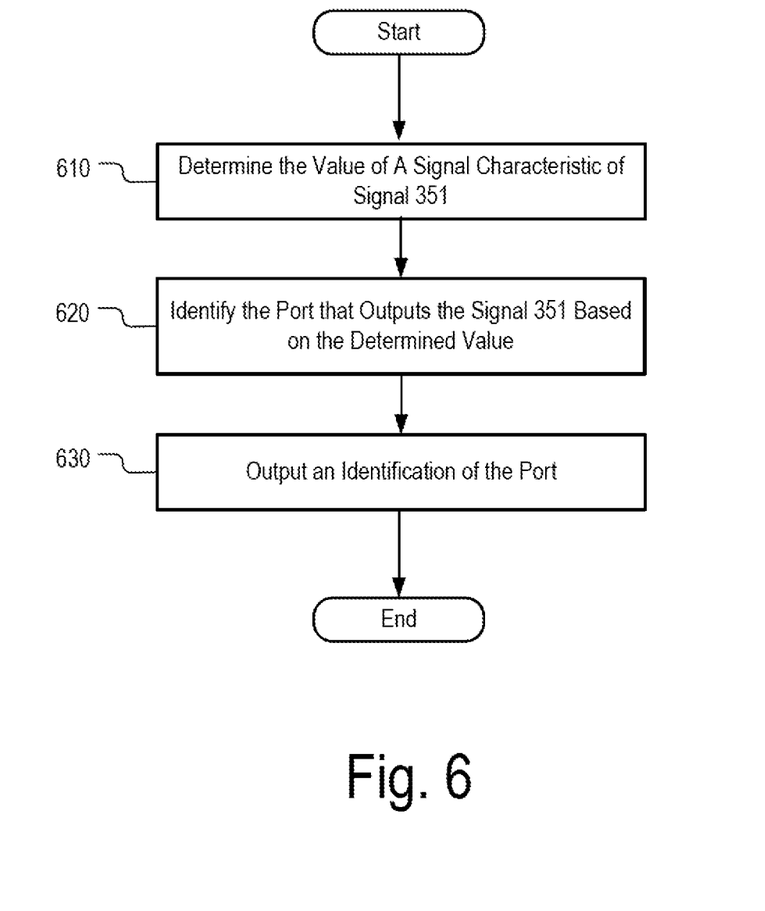
FIG. 6 depicts a flowchart of a process in accordance with aspects of the present disclosure.

FIG. 6 depicts a flowchart of an exemplary process that may be performed by application 542. At task 610, a signal characteristic value (e.g., voltage) is determined. The signal may be the signal 341 or the signal 351. The characteristic may be determined by using a sensor (e.g., voltage sensors) on the motherboard of server 101 or sensors that are part of power signal monitoring module 570. In this example, the value of the voltage of the signal 351 is determined.

At task 620, table 552 is searched to identify the port that is associated with value determined at task 610. The port identified as a result of the search is said to be the source of the signal 351. Subsequently, at task 630, the determined identifier is output. The identifier may be displayed on a display screen or transmitted over network 150 to a remote device, such as the terminal 140. For example, the identifier may be indicated using LEDs or display screen on the server 101 or alternatively, it may be displayed using a display screen of the terminal 140.

Figure 7:
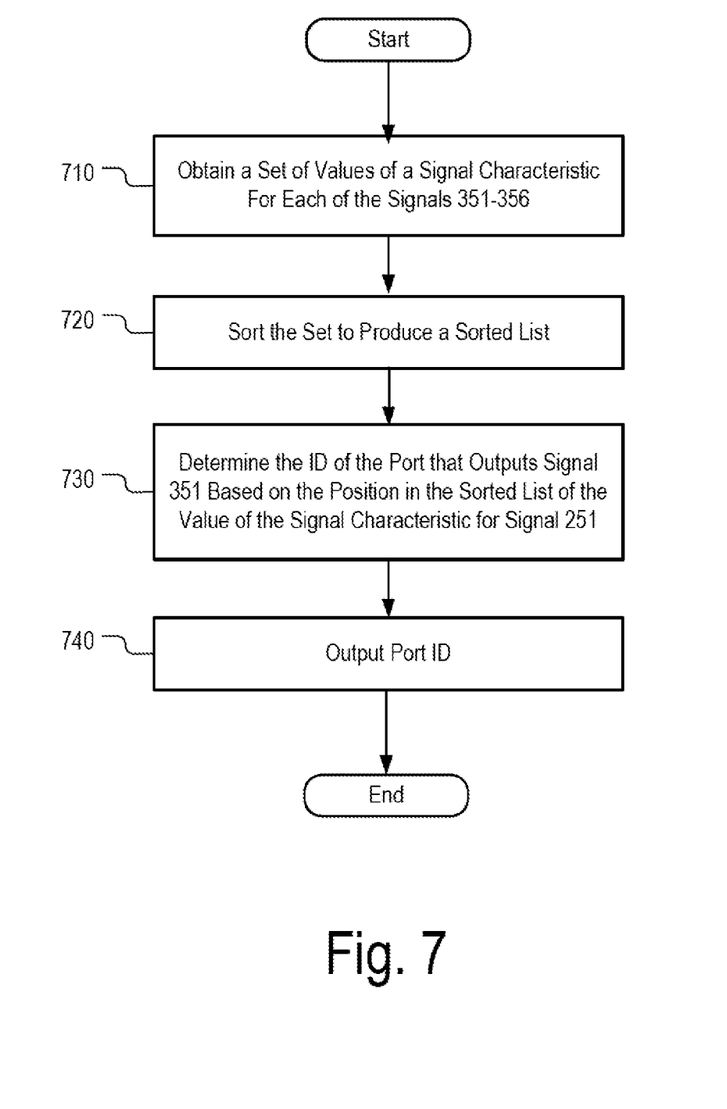
FIG. 7 depicts a flowchart of another process in accordance with aspects of the present disclosure.

FIG. 7 depicts a flowchart of another exemplary process for identifying the port that supplies signal 351 to server 101. At task 710, terminal 140 may determine characteristics of signals 351-356 that are supplied to the servers 101-106. For example, each of servers 101-106 may determine the voltage of the signal from the group of signals 351-356 that is supplied to it. Afterwards, the server may transmit an indication of the characteristic to terminal 140. At task 720, the determined characteristics may be sorted to produce a sorted list. For example, in instances where the determined characteristic is voltage, the voltages of signals 351-356 may be sorted in a descending order. At task 730, the port supplying the signal 351 may be identified based on: (i) the position of the characteristic of signal 351 in the sorted list and (ii) the relative magnitudes in the values in column 562. For example, if the signal 351 has the third highest voltage in the group of voltage measurements obtained at task 710, the signal 351 may be identified as originating from the port that is associated with the third highest voltage of the voltages in column 562. At task 740, the port identifier determined at task 730 is output. For example, the identifier may be displayed on a display screen or transmitted, over network 150, to a remote device.

FIGS. 6-7 are provided as examples. At least some of the tasks associated with FIGS. 6-7 may be performed in a different order than represented, performed concurrently or altogether omitted. Furthermore, although in the example of FIG. 3, the signals 351-356 differ from one another with respect to their voltage, in other examples they may differ with respect to another signal characteristic, such as current flow rate, power, direction, polarity, or frequency. In that regard, in the alternative examples, the circuits 331-336 may be circuits for modifying a characteristic other than voltage of the signals 351-356.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A system comprising:
   a power distribution board having a first port and a second port, the power distribution board being configured to output a first signal from the first port and a second signal from the second port, such that the first signal and the second signal differ with respect to at least one signal characteristic, the signal characteristic being selected from the group consisting of:
   (i) voltage,
   (ii) current flow rate,
   (iii) frequency, and
   (iv) polarity;

a first server capable of being powered by either the first signal or the second signal and determining whether the signal powering the first server is the first signal or the second signal based on the powering signal's signal characteristic, the first server being connected to the first port and the first server being powered by the first signal; and a second server capable of being powered by either the first signal or the second signal and determining whether the signal powering the first server is the first signal or the second signal based on the powering signal's signal characteristic, the second server being connected to the second port and the second server being powered by the second signal.

2. The system of claim 1, further comprising a server rack, wherein the first server and the second server are disposed at least partially within the server rack.

3. The system of claim 1, wherein the first server is configured to:
store, in memory, a table that relates different values for the signal characteristic with different identifiers of ports on the power distribution board, the table relating the first port to a first value;
determine a value of the signal characteristic for the first signal;
compare the determined value to values in the table; and
determine that the first server is connected to the first port when the determined value matches the first value.

4. The system of claim 1 comprising a third server,
the third server being configured to:
store, in memory, a table that relates different values for the signal characteristic with different identifiers of ports on the power distribution board, the table relating the first port to a first value;
receive a value of the signal characteristic for the first signal;
compare the received value to values in the table; and
determine that the first server is connected to the first port when the received value matches the first value.

5. The system of claim 1, further comprising a third server configured to:
store, in memory, a table identifying a first port identifier and a second port identifier;
receive a value for the signal characteristic of the first signal;
receive a value for the signal characteristic of the second signal; and
determine that the first server is connected to the first port by retrieving the first port identifier from the table when the value received for the signal characteristic of the second signal is greater than the value received for the signal characteristic of the first signal.

6. A method for powering at least a first server and a second server, the method comprising:
connecting a power distribution board to a power source;
dividing a signal supplied by the power source into at least a first signal and a second signal;
modifying a characteristic of the first signal with a first circuit to produce a first modified signal that meets the power requirements of the first server and the second server;
modifying a characteristic of the second signal with a second circuit to produce a second modified signal that meets the power requirements of the first server and the second server;
outputting the first modified signal, from a first port on the power distribution board, to power the first server; and
outputting the second modified signal, from a second port on the power distribution board, to power the second server; and
wherein the first circuit and second circuit are configured such that the port from which the first server is being powered and the port from which the second server is being powered may be determined from a difference between the modified characteristic of the first signal and the modified characteristic of the second signal.

7. The method of claim 6, comprising:
obtaining a value associated with the modified characteristic of the first modified signal, and
determining that the first server is receiving power from the first port based on the value associated with the modified characteristic.

8. The method of claim 6, comprising:
obtaining a first value associated with the modified characteristic of the first modified signal and a second value associated with the modified characteristic of the second modified signal; and
determining that the first server is receiving power from the first port based on a comparison of the first value and the second value.

9. The method of claim 6, wherein the first server, the second server, and the power distribution board are installed in a server cabinet.

10. A method for identifying a port on a power distribution board that is supplying power to a server, the method comprising:
storing in a memory a first table that relates values of a signal characteristic to port identifiers, the table relating a first value of the signal characteristic to a first port identifier;
determining a value of the signal characteristic for a first signal that is supplied to the server by the power distribution board;
comparing, by a processor, the determined value to values in the table; and
determining that the server is connected to the first port, when the determined value matches the first value.

11. The method of claim 10, wherein:
the signal characteristic is voltage; and
the value of the signal characteristic for the first signal is voltage of the first signal.

12. The method of claim 10, further comprising:
modifying the first signal with a first resistor having a first resistance; and
modifying a second signal that is output from a second port of the distribution board with a second resistor, the second resistor having a second resistance different from the first resistance;
wherein the value of the signal characteristic of the first signal depends on the first resistance.

13. The method of claim 10, wherein the voltage of the first signal is determined by using one or more sensors that are part of the server.

14. The method of claim 10, further comprising powering the server with the first signal.

15. The method of claim 10, wherein the first signal is used by the server solely for the purpose of identifying a port on the power distribution board that is supplying power to the server, the method comprising powering the server with a second signal that different from the first signal.

16. The method of claim 10, further comprising outputting, for presentation to a user, an indication that the server is connected to the first port, when the determined value matches the first value.

17. An apparatus for identifying a port on a power distribution board that is supplying power to a server, the apparatus comprising:
a memory that stores a table, the table at least relating:
(i) a first value for a signal characteristic with a first port identifier; and
(ii) a second value for the signal characteristic with a second port identifier, the first value being greater than the second value;
a processor, coupled to the memory, the processor being configured to:
receive a third value of the signal characteristic for a first signal that is supplied to a first server;
receive a fourth value of the signal characteristic for a second signal that is supplied to a second server; and
determine that the first server is connected to the first port based on one or more of:
(i) the third value being less than the fourth value,
(ii) the first value being less than the third value, or
(iii) the third value being equal to the first value.

18. The apparatus of claim 17, wherein:
the signal characteristic is voltage;
the first value and the second value are different voltage values that are associated with different port identifiers by the table;
the third value is voltage of the first signal; and
the fourth value is voltage of the second signal.

19. The apparatus of claim 17, wherein the first signal and the second signal are used to power the first server and the second server, respectively.

20. The apparatus of claim 17, wherein the first server and the second server are powered with signals different from the first signal and the second signal.

21. A power system comprising:
an input configured to receive a source power signal from a power source;
a first port and a second port, each port configured to output a power signal to power a device plugged into the port;
a signal divider configured to divide the source power signal into a first power signal and a second power signal;
a first circuit configured to modify a characteristic of the first power signal so as to create a first modified power signal and output the first modified power signal from the first port, such characteristic being predetermined to identify the first port and distinguish the second port; and
a second circuit configured to modify a characteristic of the second power signal so as to create a second modified power signal and output the second modified power signal from the second port, such characteristic being predetermined to identify the second port and distinguish the first port.

22. The power system of claim 21 wherein the first circuit comprises resistors and the second circuit comprises resistors, the resistors of the first circuit are different from the resistors of the second circuit, and the predetermined characteristic is a difference in the magnitude of the voltage output by the ports.

23. The power system of claim 21 wherein the characteristic of the first power signal and the characteristic of the second power signal is selected from the group consisting of: voltage, current flow rate, polarity and frequency.

\* \* \* \* \*